United States Patent
Schindele et al.

[11] Patent Number: 5,641,221
[45] Date of Patent: Jun. 24, 1997

[54] LIGHTED DISPLAY FIELD

[75] Inventors: Wolfgang Schindele, Weil der Stadt; Stefan Kuerth, Karlsruhe, both of Germany

[73] Assignee: Dr. Ing. h.c.F. Porsche AG, Weissach, Germany

[21] Appl. No.: 494,003

[22] Filed: Jun. 23, 1995

[30] Foreign Application Priority Data

Jun. 23, 1994 [DE] Germany .................. 44 21 942.3

[51] Int. Cl.⁶ .................................................. B60Q 1/24
[52] U.S. Cl. ........................ 362/80; 362/81; 362/84; 40/544; 40/556; 40/580; 40/591; 315/84
[58] Field of Search .................. 40/542, 544, 556, 40/579, 580, 591, 593; 362/61, 80, 81, 84; 315/84, 77

[56] References Cited

U.S. PATENT DOCUMENTS

| | | | |
|---|---|---|---|
| 1,439,210 | 12/1922 | Webster et al. | 362/81 |
| 1,473,561 | 11/1923 | Jones | 40/580 |
| 1,519,734 | 12/1924 | Komacki | 362/81 |
| 2,214,447 | 9/1940 | Bave | 362/80 |
| 2,791,050 | 5/1957 | Neugass | 40/544 |
| 3,531,881 | 10/1970 | Carley | 40/544 |
| 4,494,326 | 1/1985 | Kanamori | 40/593 |
| 5,005,306 | 4/1991 | Kinstler | 40/591 |
| 5,339,550 | 8/1994 | Hoffman | 40/544 |

FOREIGN PATENT DOCUMENTS

| | | |
|---|---|---|
| 7608374 | 7/1976 | Germany . |
| 9216056 | 4/1993 | Germany . |
| 9218253 | 1/1994 | Germany . |

*Primary Examiner*—Alan Cariaso
*Attorney, Agent, or Firm*—Evenson, McKeown, Edwards & Lenahan, P.L.L.C.

[57] ABSTRACT

A lighted display field for writing, symbols or the like, is provided on a wall part, for example, a door entrance strip of a vehicle. The wall part includes openings forming the writing or the symbols. A luminous foil is mounted on the covered side of the wall part and is visible through the openings.

7 Claims, 2 Drawing Sheets

LIGHTED DISPLAY FIELD

BACKGROUND AND SUMMARY OF THE INVENTION

This invention relates to a lighted display field and, more particularly, to a lighted display field, such as for writing, symbols or the like, on a wall part of a vehicle.

Luminous strips are known for use with vehicle tail lights. The luminous strips surround a wall part made, for example, of tinted glass. The wall part is provided with a firm emblem. Electric bulbs are provided behind the wall part. It is a disadvantage that the electric bulbs require a relatively large amount of space.

Furthermore, the use of entrance strips on side members in the door area of a vehicle is also known. These entrance strips may comprise writing which is, however, not lighted.

There is therefore needed a display field for writing, symbols, or the like, designed in such a manner that it can be lighted under the appropriate space conditions and with low constructional expenditures.

According to the present invention, these needs are by a lighted display field, such as for writing, symbols or the like, on a wall part of a vehicle. Openings forming the writing or the symbols are provided on the wall part. A luminous foil is mounted on a covered side of the wall part.

The principal advantages achieved by the present invention are that the field which can be lighted can be provided in a simple manner on a wall part of a vehicle, an excellent aesthetic effect is produced, and the space requirements are relatively low. This wall part may also be installed as a retrofitted part. The glass-type intermediate part is, on the one hand, used as a support for the luminous foil and projects, on the other hand, by means of elevations into openings forming the writing or the symbols whereby a plane surface is created. This plane surface not only produces an additional aesthetic effect but also prevents dirt from depositing and facilitates cleaning operations.

The luminous foil, which is to be operated through the use of alternating current, is connected to the direct-current wiring via a converter i.e., a separate current source is not required. In addition, the luminous foil is operated by way of a door switch. The door switch is situated in the vehicle anyhow, in such a manner that the field with the writing, the symbols or the like, is lighted when the door is open.

Finally, the field to be lighted may advantageously be assigned to a door entrance rail made of unpainted special steel.

Other objects, advantages and novel features of the present invention will become apparent from the following detailed description of the invention when considered in conjunction with the accompanying drawings.

DETAILED DESCRIPTION OF THE DRAWINGS

Figure 1:
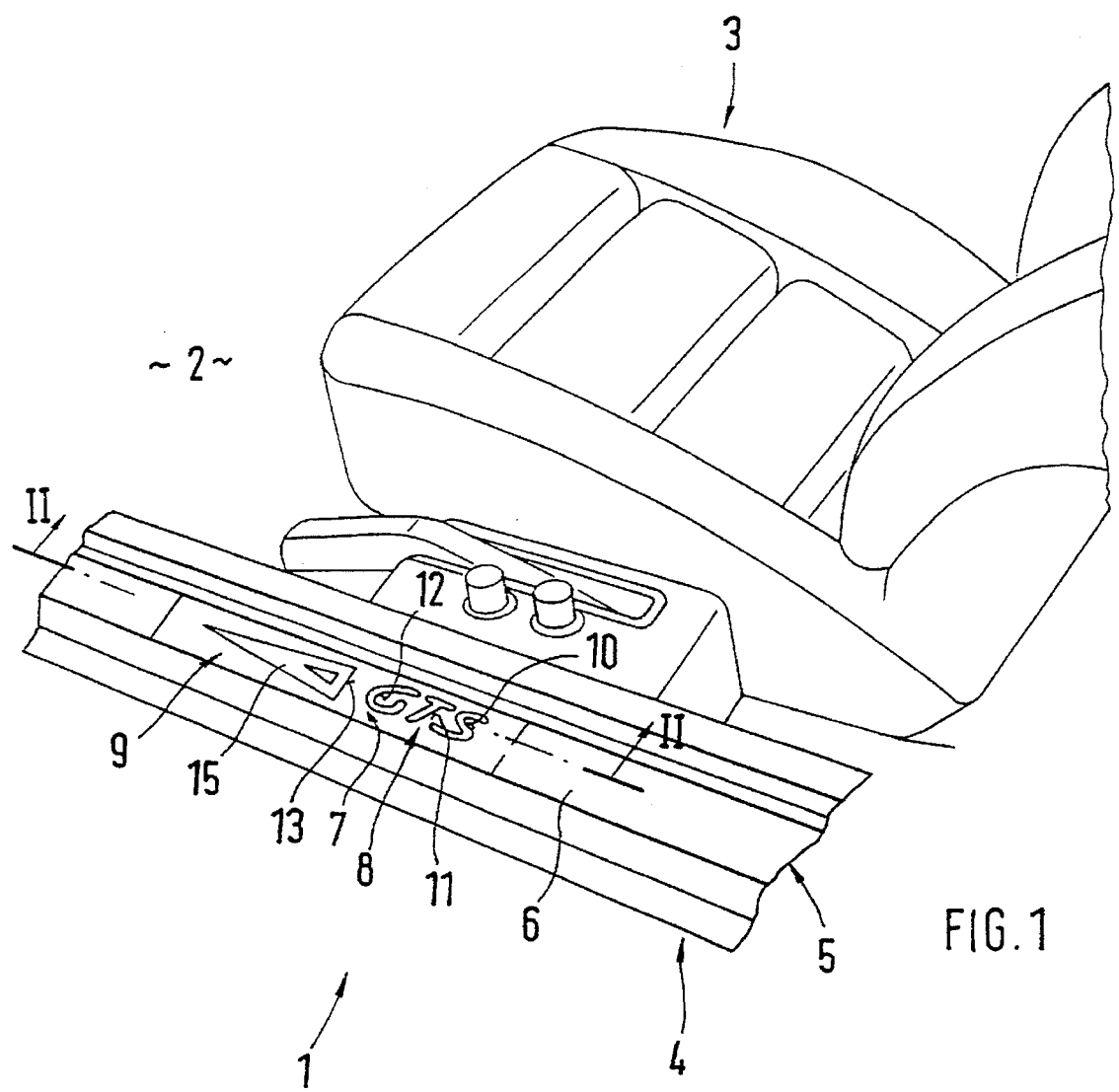
FIG. 1 is a perspective view from above a door sill of a vehicle having a field which can be lighted according to the present invention.
Figure 2:
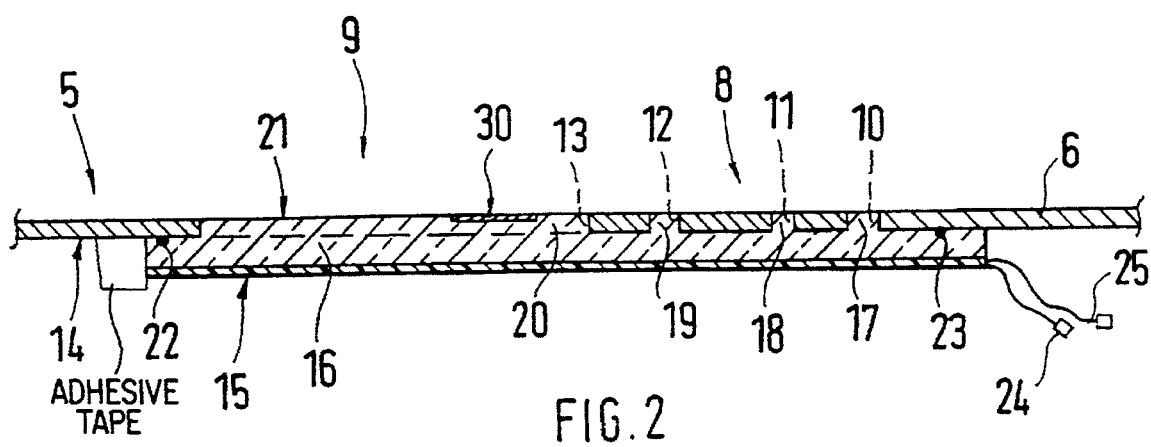
FIG. 2 is an enlarged sectional view taken along Line II—II of FIG. 1.

In the illustrated area in FIG. 1, a vehicle 1 has a passenger compartment 2 which is accessible by way of a door (not shown). Inside the passenger compartment 2, a seat 3 is shown. The seat 3 is laterally bounded by an entrance side member 4. The entrance side member 4 includes an entrance rail 5 which consists, for example, of an unpainted special steel such as an 18/8 CrNi-steel or the like and which has, on an approximately horizontally aligned wall part 6, a field 7 for writing 8 and symbols 9 which can be lighted. The writing 8 or the symbols 9 are formed by openings 10, 11, 12 and 13 which are machined out of the rail 5 via a laser application, stamping or the like. An illuminated foil 15 (FIG. 2) is mounted on a covered or underside side 14 of the wall part 6. The illuminated foil can be, for example, a foil having electroluminescence. Between the wall part 6 and the luminous foil 15, an intermediate part 16 is provided which is made, for example, of a transparent, glass-type plastic material, such as plexiglass or the like. The transparent, glass-type plastic material projects into the openings 10, 11, 12 and 13 via elevations 17, 18, 19 and 20 formed therein. These elevations are constructed to be surface-flush with a visible side 21 of the wall part 6. The intermediate part 16 is fastened on the wall part 6 by means of gluing, screwing or the like. The fastening sites have reference numbers 22 and 23. The luminous foil 15, which has connection cables 24, 25, is fastened via an adhesive tape on the wall part and/or on the intermediate part.

Figure 3:
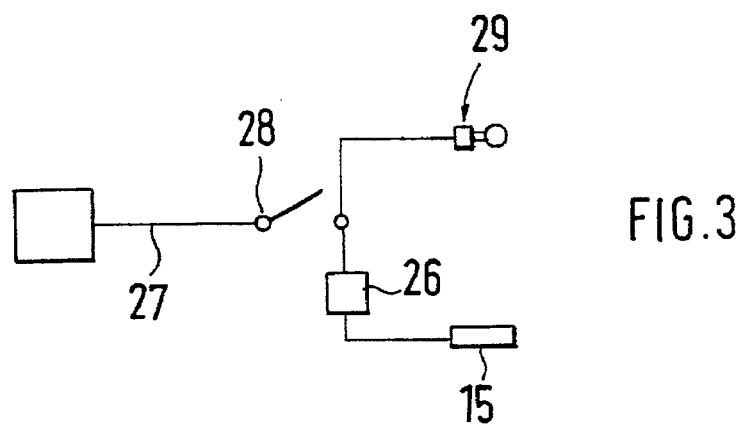
FIG. 3 is a schematic wiring diagram for the field to be lighted.

Referring to FIG. 3, using a converter 26, the luminous foil 15 is connected to the wiring 27 of the vehicle 1 and is switched on and off by means of an existing door switch 28 which is constructed for operating a passenger compartment lighting system 29.

Finally, the intermediate part 16 carries a surface part 30 which supplements the symbol and which provides, for example, the same appearance as the entrance rail 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A lighted field area providing a display on a vehicle, comprising:
   a door entrance rail of the vehicle, having a visible side and an underside, including openings which form the display;
   a luminous foil mounted on the underside of the door entrance rail, whereby an illumination of said luminous foil is visible through said openings to provide the lighted field area, a glass-type intermediate part provided between the door entrance rail and the luminous foil;
   wherein the intermediate part has elevations which project into the openings so as to be flush with a top surface of the visible side of the door entrance rail.

2. Lighted field area according to claim 1, further comprising means for fastening the intermediate part to the door entrance rail.

3. Lighted field area according to claim 1, further comprising an adhesive tape fastening the luminous foil on at least one of the door entrance rail and the intermediate part.

4. Lighted field area according to claim 1, further comprising vehicle wiring connected to the luminous foil through a converter.

5. Lighted field area according to claim 1, further comprising a door switch, wherein the luminous foil is switched on via the door switch.

6. Lighted field area according to claim 1, wherein the intermediate part includes surface parts supplementing the formation of the display.

7. Lighted field area according to claim 1, wherein the display comprises at least one of writing and symbols.

* * * * *